Patented Aug. 28, 1951

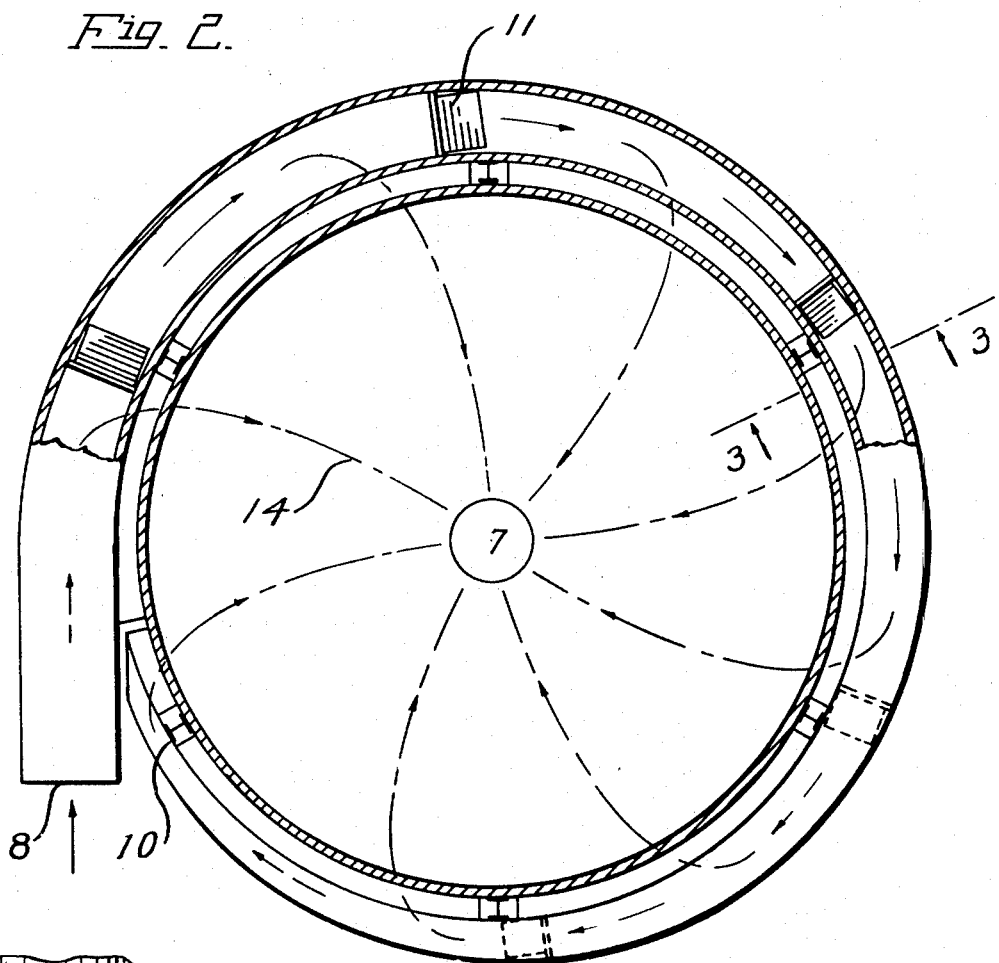
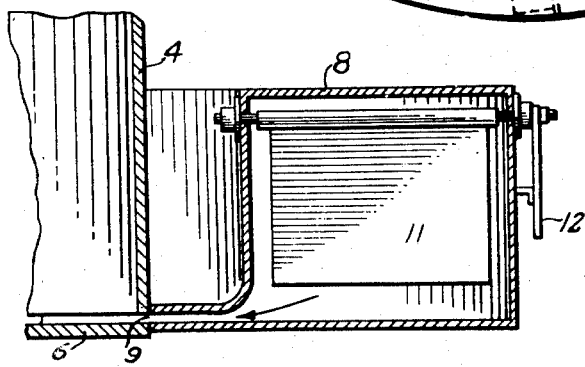

2,566,292

UNITED STATES PATENT OFFICE 2,566,292

SPRAY DRYING APPARATUS

Francis E. Reese, Springfield, Mass., assignor to Monsanto Chemical Company, St. Louis, Mo., a corporation of Delaware Application September 21, 1948, Serial No. 50,355

4 Claims. (Cl. 159—4)

This invention relates to spray drying processes and apparatus therefor. More particularly the invention relates to an improved method and means for removing dried material from the bottom of a spray drying apparatus.

Spray driers are used as rapid and efficient means for removing volatile materials from various types of solids. Roughly, they operate as follows: (1) the solid material dissolved in or mixed with a volatile material is introduced into the top of a tower in the form of a spray; (2) a hot gaseous medium is introduced into the tower at or near the top thereof and is directed so that it mixes quickly and thoroughly with the spray; (3) the volatile material is evaporated and becomes greatly diluted by the gaseous medium precipitating the solid material in the form of a dried powder; (4) the gaseous mixture is drawn off at or near the bottom of the tower carrying with it the major portion of the dry powder; (5) a minor portion of the dry powder collects on the bottom of the tower and must be removed therefrom.

Most of the problems concerned with the introduction of the material to be dried and the drying medium have been solved, but the problem of removing all of the dried material from the bottom of the tower has not been completely overcome. The accumulation of appreciable amounts of dried material on the floor of the driers decreases the efficiency of the drying process and in many cases is detrimental to the properties of the recovered material. For example, if the materials are not completely dry or if they have a tendency to be tacky, they may agglomerate into large chunks which when ultimately recovered must be broken up. Furthermore, if the dried material is unstable in character, it may discolor or decompose during a prolonged stay on the surfaces of the drier.

Many mechanical devices have been developed for removing that portion of the dried material which is deposited on the floor of the driers. Among such devices are mechanical sweeps that continuously act to remove the dried powder as soon as it falls and air sweeps operating from revolving jets situated in the drier slightly above the bottom thereof. It has been found impossible to remove all of the accumulated material by these methods and the structures used to hold the sweeping devices in position and to actuate them have served as additional surfaces for the accumulation of the dried powder. When using these devices, it has been necessary to cease operations frequently to remove the accumulated solids manually.

Attempts have been made to solve the problem by designing the floor of the drier as an inverted cone having rather steep sides. This innovation is efficient if the solid material is completely dry and non-tacky when it comes into contact with the sides. If it is not dry or is tacky, the powder particles tend to stick to the sides of the cones and to gradually build up a coating of substantial thickness and in some cases to partially close the exis port. Again the operation must be stopped and the accumulated material removed manually by arduous and time consuming methods. Additionally, the amount of material adhering to the sides of the cones represents a substantial loss if it has become discolored or otherwise impaired during the build-up period.

The difficulties with the usual spray drying apparatus are accentuated when resinous materials which are thermo-responsive are dried since they have a strong tendency to adhere to floors, walls, and mechanical sweeping devices at the temperatures which must be used in the drying apparatus.

An object of this invention is to provide an improved spray drying apparatus.

A further object is to provide an improved means for removing the dried product from the spray drying apparatus.

Still another object is to provide a means for preventing the accumulation of dried material on the floors of spray driers.

Other objects will be evident from an inspection of the accompanying drawings in which:

Figure 2 is a cross section taken through lines 2—2 of Figure 1 with a portion of the bustle pipe being broken away; and Figure 3 is a cross section taken through the lines 3—3 of Figure 2.

Figure 1:
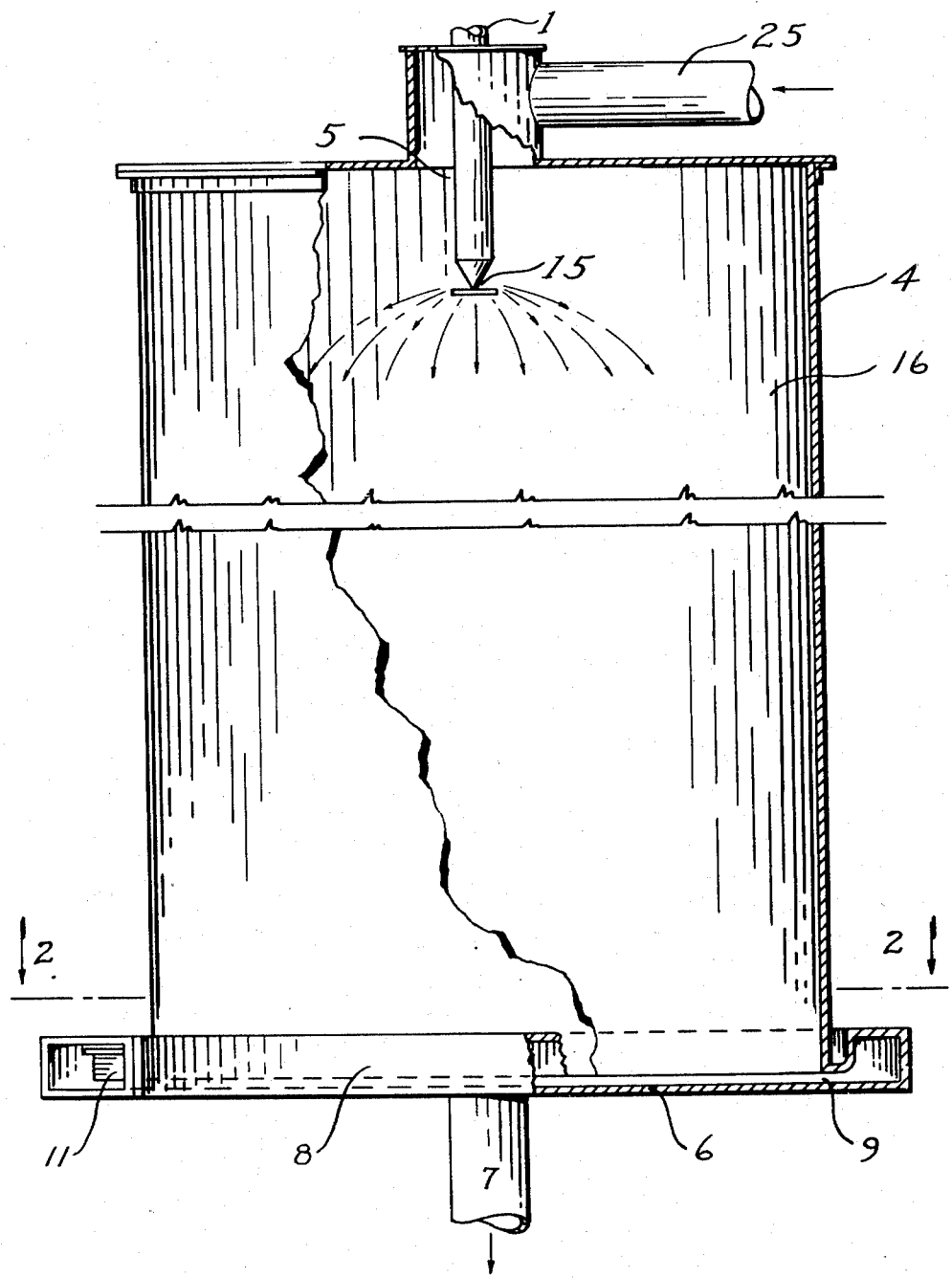
Figure 1 is a diagrammatic view of a spray drying tower partly in section.

These and other objects are attained by providing a continuous flow of a gaseous medium across the floor of a spray drier from the periphery thereof to the centrally located exit port thereof.

Referring to the figures, spray tower 4 is provided at the top with a conduit 1 carrying atomizing means 15 leading into chamber 16. Also at the top of the tower and partially surrounding conduit 1, there is provided conduit 25 leading to port 5. Floor 6 at the bottom of the tower is provided with exit port 7.

Bustle pipe 8 is attached to the outside of the tower at substantially the bottom thereof and is connected with the inside of the tower at floor 6 through a substantially continuous gap or slot 9. The floor 6 is held in position by supports 10 which are also attached to and support drier 4. The bustle pipe 8 is provided with a series of baffle plates 11 which may be adjusted by exterior handles 12 attached thereto.

Figure 1 may be used to describe in detail the normal operation of my drier. A solution of a solid in a volatile liquid or a fluid mixture of a solid with a volatile liquid such as an aqueous slurry is introduced through conduit 1 carrying atomizing means 15 into chamber 16 of cylindrical tower 4 in the form of a fine spray. A heated gas, such as heated air, nitrogen, etc., is introduced into the chamber through port 5. The temperature of the gas is sufficiently high to evaporate the volatile liquid in the spray, and the volume of gas introduced is sufficiently high to dilute the volatile liquid to such an extent that it will not readily be reabsorbed by the dried solid. The dilute mixture of volatile liquid and gaseous heating medium retains a major proportion of the dried solids which are in pulverulent form and carries it down through the tower and out through exit port 7 to a collection device not shown. A minor portion of the dried solid material does not remain suspended in the gaseous mixture but falls to the floor of the tower 6 from which it should be removed as soon as possible. It is to be understood that the size, shape, and location of conduit 1, atomizing device 15, port 5, and port 7 may be varied to meet particular problems posed by different materials, and are shown merely to illustrate the operation of standard spray drying equipment.

In the spray drying operation, the flow of the gaseous media and of the dried particles suspended therein is controlled by maintaining a pressure differential between the inlet and the exit ports of the drying tower. It is immaterial whether the pressure differential is the difference between two positive pressures, between a positive and a negative pressure, or between atmospheric pressure and a negative pressure. A standard method of providing a pressure differential is to insert an exhaust fan in the device for receiving the dried material. If the fan is of sufficient size and design, it may be sufficient to maintain all of the pressure differential needed. However, it is also feasible to provide a blower to force the desiccating gas into the drying chamber under higher positive pressures.

The essence of this invention is a continuous flow of air or other gaseous medium across the floor of the spray drier to the exit port and a means for providing such a continuous flow. One means for providing a continuous flow of gaseous medium across the floor of the spray drier is shown at 8 in Figure 1 and in more detail in Figures 2 and 3. In this particular means, the floor of the spray drier is separated from the wall thereof by a gap or slot 9, and the gap is surrounded by a bustle pipe 8. The floor is held in position by supports 10, which also support the entire drier, and the bustle pipe 8 is attached to the outside of said supports.

Bustle pipe 8 is of gradually decreasing cross section and contains a series of baffle plates 11 which may be adjusted by exterior handles 12 or other conventional means. The function of the decreasing cross section of bustle pipe 9 and of the baffles 11 are to cooperate to insure an even flow of air across the bottom of the tower.

In operation, air or other gaseous medium such as nitrogen, carbon dioxide, etc., is introduced into bustle pipe 8 under sufficient pressure to insure a steady flow of gas into the tower. If an exhaust fan operating on the exhaust port is capable of creating a negative pressure, the pressure in the bustle pipe need not be substantially above atmospheric pressure. The gaseous medium flows from the bustle pipe through gap 9 between the floor and the wall of the spray drier and across the floor of the drying tower 6 as shown by the arrows 14 in Figure 2 to the exit port 7, carrying with it all of the dried solid material which escapes from the gaseous drying medium and substantially prevents the dried material from touching the floor.

The continuous flow of air should be maintained at such a rate that substantially none of the dried particles comes to rest on the floor of the drier. Since spray drying processes are designed to produce dry solid materials in particulate form and especially in a finely divided form, the weight of each individual particle is generally negligible, and the current of air necessary to prevent its touching the floor may be quite small and, therefore, the pressure differential between the air sweep and the exit port need not be great. However, if a material having a high density is dried, the pressure differential may be increased until it is sufficient to move the heavy particles to the exit port before they touch the floor of the drier. In general, it is desirable to so adjust the pressure differential that the continuous flow of gaseous medium is smooth and even, and no turbulence occurs since turbulent gaseous currents would tend to slow down the removal of the dried material by forcing it back up into the tower.

The temperature of the gaseous medium introduced at the bottom of the tower may be varied to meet problems peculiar to the specific materials being dried. For example, if the solid material is a synthetic resin which is thermo-responsive so that it is tacky at elevated temperatures, it is advantageous to use the gaseous medium at atmospheric temperatures which may range from 40° F. below zero to 110–120° F. above zero to provide rapid cooling of the solid material and substantially eliminate any tendency towards tackiness. Even the higher atmospheric temperatures cited above are considerably below the temperatures of the gaseous drying medium introduced at the top of the drier so that a definite cooling action is obtained. However, in the case of some high melting materials, it is advantageous to keep them at an elevated temperature until they are collected at the end of the drying operation. For these instances, the air introduced at the bottom of the tower may be preheated to any desired degree.

The foregoing description is directed to a particular means for introducing and maintaining a continuous flow of a gaseous medium across the floor of the spray drying tower. It may be varied by building the bustle pipe onto the lower end of the drier walls and attaching the supports for the drier walls outside of the bustle pipe. Alternatively for many applications, the bustle pipe may be removed entirely, and air may be drawn into the tower from the surrounding atmosphere. Still another means might be a plurality of air jets spaced at intervals around the periphery of the base of the cylindrical walls. In this case, care must be taken to spread the flow as evenly as possible and avoid the creation of dead spots not reached by the air flow.

This invention has been described with reference to a spray drier in which the exit port is located in the center of a flat floor of the spray drying tower. It is also possible to arrange a series of exit ports around the outer edge of the floor and introduce the air sweep from a position in the middle of the floor. As long as a pressure differential is maintained between the exit ports and the incoming air, the dried particles will be swept into the exit ports without entering the air intake port.

Still another arrangement of a spray drier embodying this invention includes an inverted cone-shaped floor with provision for introducing the gaseous medium around the periphery of the large end of the cone directing the flow of the gas down the sides of the cone.

The process and apparatus of this invention is applicable to the spray drying of any inorganic or organic materials from solutions, emulsions, dispersions, or slurries thereof in volatile liquids. Among the materials which may be dried are natural and synthetic resins, soaps, detergents, waxes, foodstuffs, including milk, eggs, etc., organic and inorganic salts, etc.

This invention provides a simple and efficient method for preventing dried material from settling on and adhering to the floor of spray driers and for moving the dried material which escapes from the desiccating gas to the exit port of the drier.

It is obvious that many variations may be made in the process and apparatus of this invention without departing from the spirit and scope thereof as defined in the appended claims.

What is claimed is:

1. In a spray drying apparatus comprising a tower, an opening centrally located in the bottom of said tower for removing a gaseous medium having solid particles suspended therein, a substantially continuous slot in the side of the tower and immediately adjacent the bottom thereof, a conduit of decreasing cross-sectional area annularly disposed about the bottom of said tower, and a substantially continuous duct connecting said conduit and the bottom of said tower, the bottom of said duct being in the same plane with the bottom of the tower where it connects therewith to allow a smooth gaseous stream to pass along the bottom of said tower from said conduit to said centrally located opening.

2. Apparatus as defined in claim 1 in which the interior of the conduit contains a plurality of baffle plates spaced along the length thereof to adjust the rate of flow of gas through said conduit and duct into said tower.

3. In a spray drying apparatus comprising a tower, an opening centrally located in the bottom of said tower for removing a gaseous medium having solid particles suspended therein, a substantially continuous slot in the side of the tower and immediately adjacent the bottom thereof, a conduit annularly disposed about said slot and communicating therewith, the bottom of said conduit being in the same plane as the bottom of the tower to allow a gaseous stream to be introduced parallel with the bottom of said tower and in the direction of said centrally located opening.

4. In a spray drying apparatus comprising a tower, an opening centrally located in the bottom of said tower for removing a gaseous medium having solid particles suspended therein, a substantially continuous slot in the side of the tower and immediately adjacent the bottom thereof, the lower edge of said slot being the periphery of the bottom of the tower, and means for introducing a gaseous stream through said slot across the bottom of the tower in the direction of said opening.

FRANCIS E. REESE.

REFERENCES CITED

The following references are of record in the file of this patent:

UNITED STATES PATENTS

| Number | Name | Date |
|---|---|---|
| 1,107,784 | Gray | Aug. 18, 1914 |
| 1,624,739 | Jones | Apr. 12, 1927 |
| 1,829,477 | Douthitt | Oct. 27, 1931 |
| 1,946,566 | Bowen | Feb. 13, 1934 |
| 2,287,795 | Hall | June 30, 1942 |
| 2,292,572 | Komline | Aug. 11, 1942 |
| 2,460,546 | Stephanoff | Feb. 1, 1949 |